(12) United States Patent
Shepherd et al.

(10) Patent No.: US 11,983,832 B2
(45) Date of Patent: May 14, 2024

(54) COMPENSATING FOR DIMENSIONAL VARIATION IN 3D PRINTING

(71) Applicant: Hewlett-Packard Development Company, L.P., Spring, TX (US)

(72) Inventors: Matthew A. Shepherd, Vancouver, WA (US); Barret Kammerzell, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 481 days.

(21) Appl. No.: 17/288,816

(22) PCT Filed: Apr. 25, 2019

(86) PCT No.: PCT/US2019/029137
§ 371 (c)(1),
(2) Date: Apr. 26, 2021

(87) PCT Pub. No.: WO2020/219053
PCT Pub. Date: Oct. 29, 2020

(65) Prior Publication Data
US 2021/0394450 A1 Dec. 23, 2021

(51) Int. Cl.
| | |
|---|---|
| *G06T 19/20* | (2011.01) |
| *B22F 10/80* | (2021.01) |
| *B29C 64/393* | (2017.01) |
| *B33Y 50/02* | (2015.01) |
| *G06F 30/17* | (2020.01) |
| *G06F 113/10* | (2020.01) |

(52) U.S. Cl.
CPC .............. *G06T 19/20* (2013.01); *B22F 10/80* (2021.01); *B29C 64/393* (2017.08); *B33Y 50/02* (2014.12); *G06F 30/17* (2020.01); *G06F 2113/10* (2020.01)

(58) Field of Classification Search
CPC ...... G05B 150/02; G05B 15/02; B33Y 50/00; B33Y 50/02; B29C 64/393
USPC .......................................................... 700/118
See application file for complete search history.

(56) References Cited

U.S. PATENT DOCUMENTS

| | | | |
|---|---|---|---|
| 8,175,734 B2 | 5/2012 | Fogel et al. | |
| 10,073,424 B2* | 9/2018 | Lin | G06F 30/20 |
| 2005/0154481 A1* | 7/2005 | Berger | B33Y 50/00 |
| | | | 700/98 |
| 2010/0191360 A1 | 7/2010 | Napadensky et al. | |
| 2011/0205583 A1* | 8/2011 | Young | G06F 30/20 |
| | | | 358/1.15 |
| 2013/0026683 A1 | 1/2013 | Ng et al. | |
| 2014/0368504 A1 | 12/2014 | Chen et al. | |
| 2015/0009214 A1 | 1/2015 | Lee et al. | |

(Continued)

FOREIGN PATENT DOCUMENTS

| | | | | |
|---|---|---|---|---|
| CN | 115270449 A | * | 11/2022 | |
| GB | 2478067 A | * | 8/2011 | ......... B29C 67/0088 |

(Continued)

*Primary Examiner* — Ronald D Hartman, Jr.
(74) *Attorney, Agent, or Firm* — Michael Dryja (57) ABSTRACT

In an example implementation, a method of compensating for dimensional variation in 3D printing includes receiving a voxel space model that represents a 3D object to be printed within a build volume of a 3D printing system, asymmetrically eroding voxels from the voxel space model, and printing the 3D object based on the asymmetrically eroded voxel space model.

12 Claims, 5 Drawing Sheets

(56) References Cited

U.S. PATENT DOCUMENTS

2017/0001375 A1* 1/2017 Melly ................... B29C 64/386
2018/0370147 A1   12/2018 Peter et al.

FOREIGN PATENT DOCUMENTS

| WO | WO-2004068300 A2 * | 8/2004 | ............. G06F 16/00 |
| WO | WO-2018154767 | 8/2018 | |
| WO | WO-2018161994 | 9/2018 | |
| WO | WO-2019021291 A1 * | 1/2019 | ........... B29C 64/112 |
| WO | WO-2019125450 A1 * | 6/2019 | .............. B22F 10/10 |
| WO | WO-2019209327 A1 * | 10/2019 | |
| WO | WO-2020076304 A1 * | 4/2020 | ........... B29C 64/153 |

* cited by examiner

COMPENSATING FOR DIMENSIONAL VARIATION IN 3D PRINTING

BACKGROUND

Additive manufacturing machines can produce three-dimensional (3D) objects by layering and solidifying build material in the shape of 3D object models. Data defining a 3D object model can be processed into 2D data slices that each define a portion or portions of a layer of build material to be formed into a physical object. In some examples, 3D printers use inkjet printheads to selectively print (i.e., deposit) liquid functional agents, such as fusing agents or binder liquids, onto the portions of each layer of build material that are to become part of the object. The liquid agents can facilitate the solidification of the build material within the printed areas. For example, fusing energy can be applied to a build material layer to thermally fuse build material in areas where a liquid fusing agent has been printed. The fusing and solidification of printed areas from numerous layers forms the object into the shape of the 3D object model.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

In some additive manufacturing processes, such as some 3D printing processes for example, 3D objects or parts can be formed on a layer-by-layer basis where each layer is processed and portions thereof combined with subsequent layers until the 3D object is fully formed. The build material used for producing 3D objects is generally referred to herein as being powdered build material, such as powdered nylon. However, there is no intent to limit the form or type of build material that can be used when producing a 3D object, and various forms and types of build materials may be appropriate and are contemplated herein. Examples of different forms and types of build materials can include, but are not limited to, short fibers that have been cut into short lengths or otherwise formed from long strands or threads of material, various powder and powder-like materials including plastics, ceramics, metals, and the like. In some examples, a suitable build material can include PA12 build material commercially known as V1R10A "HP PA12" available from HP Inc.

In some 3D printing processes, layers of a 3D object can be produced based on 2D data slices of a digital 3D object model, where each 2D slice defines a portion or portions of a powder layer that are to form a layer of the 3D object. Information in a 3D object model, such as geometric information that describes the shape of the 3D model, can be stored as plain text or binary data in various 3D file formats, such as STL, VRML, OBJ, FBX, COLLADA, 3MF, and so on. Some 3D file formats can include additional information about 3D object properties such as conductivity, density, porosity, plasticity, hardness, ductility, strength, interlayer strength and/or appearance properties (color, transparency, glossiness, surface texture, etc.), and combinations thereof.

In some examples, 3D space is characterized in terms of 'voxels'. A voxel is a volumetric element analogous to a pixel in 2D. A voxel represents a discrete volume at a given location within a notional volume, such as within a digital 3D object model. In one example of volumetric data modeling, sometimes referred to as 'voxelization', a 3D object can be expressed or represented as a digital voxel-space object model. A voxel-space object model can be considered to be a particular type of digital 3D object model that represents a 3D object. In a voxel-space object model, a voxel at a given location may have a particular characteristic or a number of characteristics. For example, a voxel may be empty, indicating that it does not represent a solid portion of an object, or it may be designated with a particular color, indicating that it represents a solid portion of an object. Thus, a voxel can comprise multiple characteristics that indicate properties of a 3D object such as the properties noted above.

Voxels representing a 3D object can be the same shape and size. For example, voxels can be cubic, rectangular, or some other shaped block or volume, where each voxel has the same dimensions. In other examples, voxels representing an object can vary in size and/or shape. In some examples, voxels can be arranged through volumetric data modeling (e.g., during voxelization of a 3D object model) into a 3D grid that corresponds with the resolution of a 3D printing device. For example, the XY dimensions of each voxel can correspond with the resolution of a printhead to be used in a 3D printer to deposit a liquid fusing agent onto a layer of build material (e.g., powder) within a build volume, while the Z dimension of the voxel can correspond with the depth resolution at which a 3D printer can incrementally deposit layers of build material within the build volume.

In some examples, a 3D printing system can have printheads with 600 DPI (drops per inch) resolution in the XY directions and an object layer thickness resolution of 80 microns in the Z direction. In some examples, the layer thickness resolution can be other values, such as 70 microns. In these examples, voxels can be arranged into a convenient grid of rectangular shaped blocks, where each voxel represents a volume within 3D space (i.e., within a build volume) having the dimensions of 42 microns in the X dimension, by 42 microns in the Y dimension, by 80 microns, for example, in the Z dimension. Thus, the depth of one voxel in the Z dimension in the voxel-space object model can represent one layer of the object within the build volume that is 80 microns thick. In other examples, a 3D printing system can have printheads with 1200 DPI resolution in the XY directions and an object layer thickness resolution of 80 microns, for example, in the Z direction. In these examples, voxels arranged into a grid of rectangular shaped blocks can each represent a volume within 3D space (i.e., within a build volume) having the dimensions of 21 microns in the X dimension, by 21 microns in the Y dimension, by 80 microns in the Z dimension. Again, the depth of one voxel in the Z dimension in the voxel-space object model can represent one layer of the object within the build volume that is 80 microns thick.

As indicated above, voxels in a digital voxel-space object model comprise information that can define solid portions of a 3D object to be printed or produced. To produce a 3D object from such a digital object model, the model can be processed to provide 2D data slices. In some examples, each 2D data slice can comprise a single voxel layer of the object model that represents a single physical layer of the 3D object. In some examples, 3D printers can receive and process 3D object models into such 2D data slices. In some examples, 3D printers can receive 3D object models, convert them into voxel-space object models, and process the voxel-space models into 2D data slices. In some examples, 3D printers can receive 3D models already converted into or expressed as voxel-space object models, and can process the voxel-space object models into 2D slices. In some examples, 3D printers can receive 2D slices that have already been processed from voxel-space object models.

Each 2D data slice generally comprises an image and/or data that can define an area or areas of a build material layer (e.g., powder) to be solidified during a 3D printing process. Thus, a 2D data slice can define areas within a powder layer as portions of an object layer that are to be printed with a liquid functional agent (e.g., a fusing agent) and subsequently solidified. In some examples, a suitable fusing agent can include an ink-type formulation comprising carbon black, such as the fusing agent formulation commercially known as V1Q60Q "HP fusing agent" available from HP Inc. In different examples, fusing agent formulations can also comprise an infra-red light absorber, a near infra-red light absorber, a visible light absorber, and a UV light absorber. Inks comprising visible light enhancers can include dye based colored ink and pigment based colored ink, such as inks commercially known as CE039A and CE042A available from HP Inc. Areas within a powder layer not defined by a 2D data slice as being portions of an object layer, comprise non-object areas where the powder is not to be solidified. Non-object areas are often not printed with a liquid functional agent, but in some cases they may be printed with a detailing agent that can be selectively applied around object contours, for example, to cool the surrounding powder material and keep it from fusing. An example of a suitable detailing agent can include a formulation commercially known as V1Q61A "HP detailing agent" available from HP Inc.

In some examples of powder-based fusing agent 3D printing systems, powdered build material layers can be spread over a platform or print bed within a build area. As each layer is deposited, the platform can move downward in the Z direction such that the build area becomes a build volume in which a 3D object can be printed and solidified. As indicated above, in some examples the layer thickness is based on the resolution of the print bed movement in the Z direction, and the thickness of one layer can be represented in a voxel-space object model by the depth of one voxel in the Z dimension. After a fusing agent is selectively printed onto a powder layer, the layer can be exposed to a fusing energy to thermally fuse together and solidify particles of powdered material in the areas that have been printed with the fusing agent. This process can be repeated, one layer at a time, until a 3D object has been formed from fused object layers within the build volume.

In some examples of powder-based fusing agent 3D printing systems, the final dimensions of a finished 3D object can vary from those indicated by the digital 3D object model (e.g., the voxel-space object model) used by the system to print the object. Such dimensional errors can be caused by a variety of factors, such as object shrinkage that can occur as the fused object cools down, or object growth that can occur when heat applied to fuse the object layers seeps out beyond the boundary of the object and causes additional surrounding build material (e.g., powder) to fuse to the object.

These dimensional errors are often addressed by a proportional scaling of all object features in a given direction, such as a proportional scaling applied to opposing sides of an object in the X directional dimension. In addition to proportional scaling, prior methods of compensating for dimensional errors of a finished 3D object include a uniform 2D depletion of the data (i.e., voxels) in the X and Y directional dimensions from each layer of the object model. The data depletion is applied to voxels of a surface that faces, or is normal to, the X and Y directional dimensions. For example, for a given 2D layer (i.e., 2D data slice) of a voxel-space object model layer in the XY plane, boundary voxels all around the outside edges of the layer are depleted or eroded uniformly. This boundary voxel erosion effectively adjusts the final object size by increments of 2 voxels, one voxel on each side of the object in both the X and Y dimensions. Boundary voxels are those voxels exposed on the right and left sides of the layer in the X directional dimension, and voxels exposed on the top and bottom sides of the layer in the Y directional dimension.

Depletion or erosion of voxels removes the voxels from the digital voxel-space object model layer so that the corresponding locations of the voxels in the physical powder material layer will no longer be printed with a fusing agent, and will therefore not be fused as a part of the finished object. Therefore, when such a powder layer is deposited and spread over a print bed during a 3D printing process, voxel depletion effectively prevents portions of powder around the border of the object that correspond with the depleted voxels and that would otherwise have become part of the object's surface, from becoming part of the object.

In some 3D printing processes, the final object dimensions can differ in a fixed way from the object model that is not proportional to the dimension size. In such cases, the proportional scaling noted above does not fully eliminate the dimensional errors. This is because smaller object features may call for the same amount of dimensional adjustment as larger object features. Where the dimensional error in a finished object is not symmetric, the prior symmetric offset solution which calls for adjusting the final object size by increments of 2 voxels (i.e., one voxel on each side of the object in both the X and Y dimensions), may not properly compensate for the non-symmetrical errors. In such cases, an appropriate dimensional correction may call for adjusting an odd number of voxels. Applying the symmetric offset solution (i.e., fixed offset to both sides of the object) in these cases can result in a residual error of more than one voxel, and the finished object shape can be distorted. Such errors can be more noticeable in the object's Z dimension, which tends to have larger voxel dimensions (e.g., 42 microns in the X and Y dimensions versus 80 microns in the Z dimension, as indicate above). In some cases, a symmetric offset can remove entire layers of data from a 2D sliced object model to reduce the final object size in Z. While this solution can be effective for simple object geometries, it does not work well for more complex shapes that are often encountered in 3D printing environments.

Accordingly, example methods and systems described herein enable improved dimensional accuracy in 3D printed objects by compensating for dimensional errors that can occur in 3D printing processes. Compensating for dimensional errors includes correcting symmetric and/or non-symmetric object expansion errors in 1, 2, or 3 dimensions. The example 3D printing systems and methods can proactively (i.e., prior to printing an object) correct for expected dimensional errors in a 3D printed object through symmetric and/or asymmetric erosion and/or dilation of data in the voxel-space object model. Upon obtaining a voxel-space object model that represents an object to be printed, voxel data at any face or surface boundary of the object model can be digitally shifted or "eroded," for example, to compensate for growth that is expected to occur at the corresponding object surface during the 3D printing process. Prior to printing and solidifying an object, a morphological erosion operation can digitally remove voxels at surface boundaries of the voxel-space object model in anticipation of such surface growth. The voxel erosion operation converts voxels at the surface/boundary of the model that would otherwise result in fused/solid material at the surface of the object, into non-surface voxels that will result in un-fused material when the object is printed.

The ability to correct for symmetric and/or non-symmetric object expansion errors in 1, 2, or 3 dimensions enables dimensional accuracy in 3D printed objects not previously available using a symmetric offset solution. Data erosion of a voxel-space object model can be applied to surface voxels that face or are normal to any one or all of the X, Y, and Z, directional dimensions. Voxels can be eroded/removed symmetrically in any single dimension or multiple dimensions (e.g., removing the same number of voxels from left and right surfaces in the X dimension), and/or asymmetrically in any single dimension or multiple dimensions (e.g., removing voxels from the left surface but not the right surface in the X dimension). The magnitude or amount of voxel surface erosion can be determined, for example, based on the subvolume of the print system build area (i.e., the subvolume within the build volume of the print bed or bucket) in which the object surface is to be printed. This is because the thermal characteristics of different subvolumes in the print system build area can vary, causing growth error to a particular side or surface of the object. Other factors that can influence the magnitude of the voxel surface erosion include, for example, the type of material being printed, the shape of the object, empirical dimensional data from measurements of previously printed objects that have the same or similar shape, and so on.

In a particular example, a method of compensating for dimensional variation in 3D printing includes obtaining a voxel-space model that represents a 3D object to be printed within a build volume of a 3D printing system, asymmetrically eroding voxels from the voxel-space model, and printing the 3D object based on the asymmetrically eroded voxel-space model.

In another example, a dimensional variation compensating 3D printing system includes a memory to receive a 3D object model that represents a 3D object to be printed within a build volume of the 3D printing system. The system includes a processor programmed to convert the 3D object model into a voxel-space model, and to erode voxels at one of two boundary surfaces in at least one of an X, Y, and Z dimension of the voxel space model. The system includes print system components controllable by the processor to print the 3D object according to the eroded voxel-space model.

In another example, a method of compensating for dimensional variation in 3D printing includes, applying asymmetrically, a morphological operation to a voxel-space object model that represents a 3D object to be printed, wherein the operation is selected from a dilation operation to add voxels to the model, and an erosion operation to deplete voxels from the model.

Figure 1:
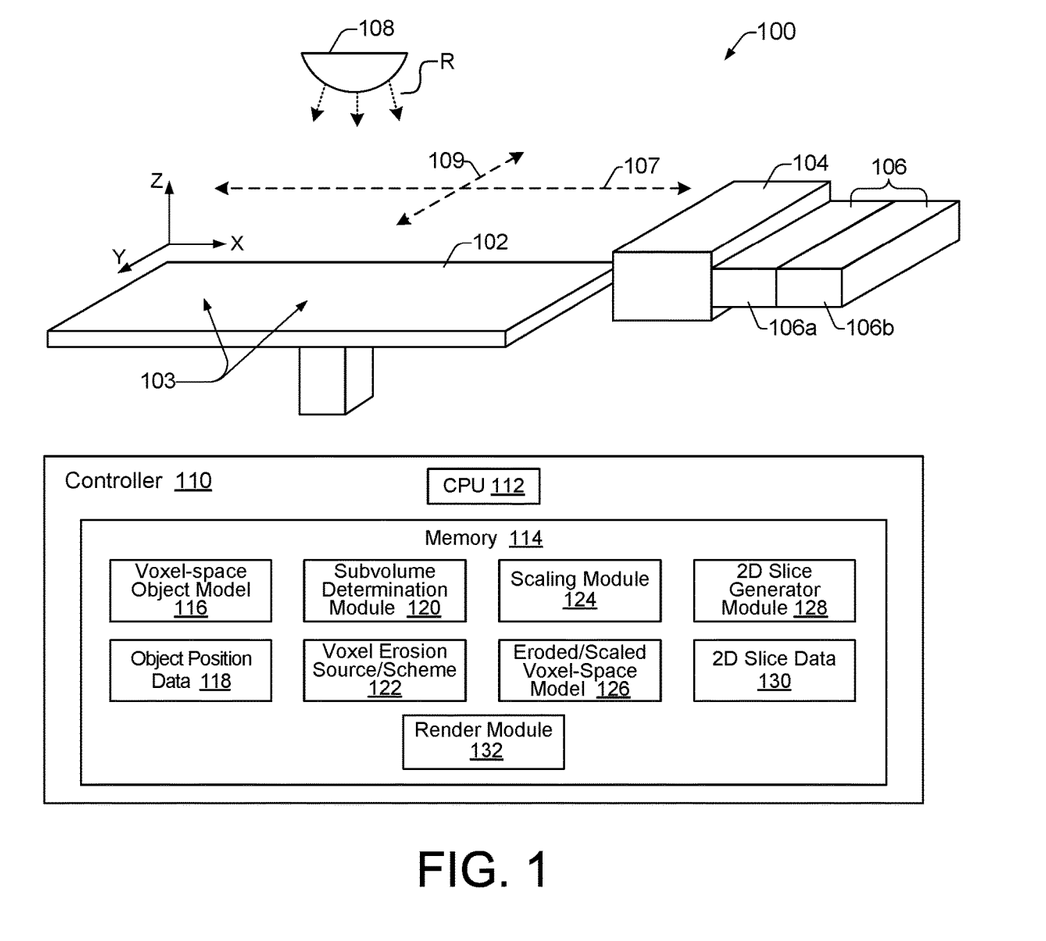
FIG. 1 shows a block diagram of an example 3D printing system suitable for providing dimensional compensation in 3D objects to correct for symmetric and/or non-symmetric dimensional errors in 1, 2, or 3 dimensions.

FIG. 1 shows a block diagram of an example 3D printing system 100 suitable for providing dimensional compensation in 3D objects to correct for symmetric and/or non-symmetric dimensional errors in 1, 2, or 3 dimensions. The 3D printing system 100 is shown by way of example, and is not intended to represent a complete 3D printing system. Thus, it is understood that an example system 100 may comprise additional components and may perform additional functions not specifically illustrated or discussed herein.

An example 3D printing system 100 includes a moveable print bed 102, or build platform 102 to serve as the floor to a work space or build volume/area 103 in which 3D objects can be printed. In some examples the print bed 102 can move in a vertical direction (i.e., up and down) in the Z-axis direction. The build volume 103 of a 3D printing system generally refers to a volumetric work space that develops above the moveable print bed 102 as the print bed moves vertically downward during the layer-by-layer printing and solidification of each layer of a 3D object. This work space can be alternately referred to herein as a build volume, a build area, a work space, and the like. In some examples, the build volume 103 can be subdivided into subvolumes as discussed in more detail below. An example 3D printing system 100 also includes a powdered build material distributor 104 that can provide a layer of powder over the print bed 102. The powder distributor 104 can include a powder supply and powder spreading mechanism such as a roller or blade to move across the print bed 102 in the X-axis direction to spread a layer of powder.

A liquid agent dispenser 106 can deliver a liquid functional agent such as a fusing agent and/or detailing agent from a fusing agent dispenser 106a and detailing agent dispenser 106b, respectively, in a selective manner onto areas of a powder layer provided on the print bed 102. Liquid agent dispensers 106 can include, for example, a printhead or printheads, such as thermal inkjet or piezoelectric inkjet printheads. In some examples, a printhead dispenser 106 can comprise a page-wide array of liquid ejectors (i.e., nozzles) that spans across the full Y-axis dimension of the print bed 102 and moves bi-directionally (i.e., back and forth) in the X-axis as indicated by direction arrow 107 while it ejects liquid droplets onto a powder layer spread over the print bed 102. In other examples, a printhead dispenser 106 can comprise a scanning type printhead. A scanning type printhead can span across a limited portion or swath of the print bed 102 in the Y-axis dimension as it moves bi-directionally in the X-axis as indicated by direction arrow 107, while ejecting liquid droplets onto a powder layer spread over the print bed 102. Upon completing each swath, a scanning type printhead can move in the Y-axis direction as indicated by direction arrow 109 in preparation for printing another swath of the powder layer on print bed 102.

The example 3D printing system 100 also includes a fusing energy source 108, such as radiation source 108, that can apply radiation R to powder layers on the print bed 102 to facilitate the heating and fusing of the powder. In some examples, the energy source 108 can comprise a scanning energy source that scans across the print bed 102 in the X-axis direction. In some examples, where a 3D printing system comprises a binder jetting system that can print a liquid binder agent onto different materials such as metals, ceramics, and plastics, for example, the system 100 can include a binder agent drying/curing unit (not shown).

Referring still to FIG. 1, an example 3D printing system 100 additionally includes an example controller 110. The example controller 110 can control various components and operations of the 3D printing system 100 to facilitate the printing of 3D objects as generally described herein, such as controllably spreading powder onto the print bed 102, selectively applying/printing fusing agent and detailing agent to portions of the powder, and exposing the powder to radiation R. In addition, the controller 110 can further control components and operations of the 3D printing system 100 to provide compensation that corrects for dimensional variations in 3D objects that can occur during a 3D printing process.

As shown in FIG. 1, an example controller 110 can include a processor (CPU) 112 and a memory 114. The controller 110 may additionally include other electronics (not shown) for communicating with and controlling components of the 3D printing system 100. Such other electronics can include, for example, discrete electronic components and/or an ASIC (application specific integrated circuit). Memory 114 can include both volatile (i.e., RAM) and nonvolatile memory components (e.g., ROM, hard disk, optical disc, CD-ROM, flash memory, etc.). The components of memory 114 comprise non-transitory, machine-readable (e.g., computer/processor-readable) media that can provide for the storage of machine-readable coded program instructions, data structures, program instruction modules, JDF (job definition format), plain text or binary data in various 3D file formats such as STL, VRML, OBJ, FBX, COLLADA, 3MF, and other data and/or instructions executable by a processor 112 of the 3D printing system 100. Examples of data that can be received and/or generated by the controller 110 and stored in memory 114, include 3D object model data 116 (e.g., a voxel-space object model 116), object position data 118, a compensation factor source 122 such as a lookup table, eroded voxel-space model data 126, and 2D slice data 130. Examples of executable instructions that can be stored in memory 114 include instructions associated with modules 122, 124, 128, and 132.

A 3D printing system 100 can receive or otherwise access a voxel-space object model 116 that represents an object to be printed. In different examples, a voxel-space object model 116 can be received directly by the system 100, or it can be received as a 3D object model 116 in another format such as 3MF and then converted by the processor 112 into a voxel-space object model format. The voxel-space object model 116 can include geometric information that describes the shape of the 3D object, as well as information indicating colors, surface textures, build material types, the position for printing the 3D object within the build volume 103, and so on.

In some examples, the processor 112 can execute instructions from a subvolume determination module 120 to determine a target subvolume 134 (FIG. 2; example subvolumes 134a, 134b, 134c, 134d, 134e, 134f, 134g, 134h) within the build volume 103 where all or part of a 3D object is to be printed. A target subvolume 134 can be determined based on object position information in the voxel-space object model 116, or received independently as object position data 118, for example, from a user. Object print position information 118 can include, for example, X, Y, and Z, axis coordinates to locate the object to be printed within the build volume 103, as well as various empirical data that indicates characteristics of the build volume and the object to be printed.

In general, an object's print position within the build volume 103 can be based on factors such as the size, shape, and number of other objects being printed at the same time within the build volume 103. For example, it can be economically beneficial to print multiple objects together in the build volume 103 during a print process, and the positioning of each object may depend on the sizes, shapes, and number of the multiple objects to be printed. An object's print position within the build volume 103 may also be based on various empirical information known about the printing system 100 and the object to be printed. For example, thermal characteristics throughout the build volume 103 may be empirically known to alter dimensions of an object in a particular way depending on where the object is positioned in the volume. In some specific examples, empirical data may indicate that a certain location (i.e., subvolume) within the build volume 103 gets hotter than other locations, remains hotter longer than other locations, is cooler than other locations, cools down more quickly than other locations, and so on, thus causing dimensional errors in all or part of a 3D object being printed in that subvolume. In addition, empirical dimensional data measured from a previously printed object of the same build material type and/or the same or similar shape as a current object being printed, may indicate that printing the object in a particular subvolume of the build volume 103 can result in certain features of the object having dimensional errors.

Figure 2:
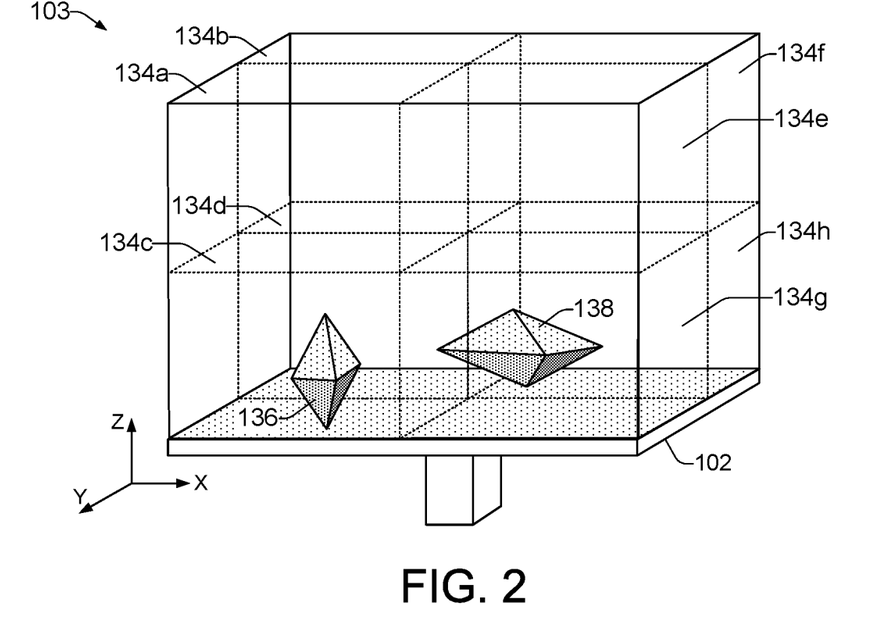
FIG. 2 shows an example of a build volume that has been subdivided into multiple volumetric subdivisions, or sub-volumes.

FIG. 2 shows an example of a build volume 103 that has been subdivided into multiple volumetric subdivisions, or subvolumes 134 (illustrated as subvolumes 134a, 134b, 134c, 134d, 134e, 134f, 134g, and 134h). While the example build volume 103 shown in FIG. 2 has been divided into eight equally sized, and rectangular shaped subvolumes, other subvolume configurations are possible. Therefore, other examples may include any number of subvolumes, with each subvolume having any manner of shape and size that together make up the entire volume of the build volume 103.

FIG. 2 also shows examples of two objects 136 and 138 that are to be printed within the build volume 103. Referring to FIGS. 1 and 2, the controller 110 (processor 112) can execute instructions in the subvolume determination module 120 to determine target subvolumes into which the objects are to be printed. In the example shown in FIG. 2, a first object 136 is to be printed in the lower left, front, subvolume 134c, and the second object 138 is to be printed in both of the lower, rear, subvolumes, 134h and 134d. Thus, subvolumes 134c, 134h, and 134d are target subvolumes into which a 3D object, or a portion of a 3D object, is to be printed. The two objects 136 and 138 shown in FIG. 2 help to illustrate that in different examples, objects can be printed within a single subvolume 134 or they can be printed within multiple subvolumes.

Determining a target subvolume 134 in which a 3D object will be printed, enables a determination to be made as to what voxel data erosion should be applied to a voxel-space object model 116 in order to avoid (i.e., compensate for) dimensional error that may otherwise result from printing the object in that target subvolume. In some examples, in addition to determining a target subvolume, other factors such as empirical dimensional data measured from previously printed objects, types of build material, and so on, can also be part of enabling the determination as to what voxel data erosion should be applied. Voxel data erosions can be indicated, for example, as certain types of erosions such as a symmetric or asymmetric erosions, to be applied at certain locations such as on one or multiple surfaces of an object model that are normal to any of X, Y, and Z dimensions, and to be applied in certain amounts/magnitudes such as the numbers of voxels to be eroded. Thus, determining an appropriate voxel data erosion can be referred to as determining a "voxel data erosion scheme."

In some examples, a voxel erosion source 122 such as a look-up table can associate voxel data erosion schemes with different subvolumes 134. Such associations can be previously determined based on thermal characteristics of each subvolume and other empirical information that indicate expected dimensional errors associated with each subvolume. An Erosion Table is shown and discussed herein below as being one example of a voxel erosion source 122. However, other methods and sources for determining voxel data erosion schemes (i.e., types, locations, and amounts of voxel data erosions) are possible and are contemplated. For example, such schemes could be input by a user for particular 3D objects to be printed, or a processor executing instructions may determine such schemes based on information including a determined target subvolumes and/or other empirical data regarding particular 3D objects to be printed.

An example of a simplified Erosion Table is shown below that provides a summary of voxel data erosion schemes that can be associated with the different subvolumes 134. For the sake of brevity, the specific associations themselves are not shown in the simplified table. Moreover, a "shorthand" method is used in the table to indicate the many permutations of dimensional directions that are available for the different erosion schemes. An actual example Erosion Table (not shown) from a voxel erosion source 122 can provide each actual dimensional direction and a specific subvolume association for each. However, an actual Erosion Table involves a considerably larger table than the simplified version shown below. Thus, a shorthand is used in the simplified Erosion Table that provides for an arbitrary designation of the dimensional directions in which voxel data erosion is to occur. More specifically, the shorthand used in the simplified Erosion Table provides that $x_1$ can be any of x, y, or z dimensional directions, $x_2$ can be either of the dimensional directions that remain, and $x_3$ can be the last of the three dimensional directions that remains.

symmetric or asymmetric, in which direction (+/−) the greater amount of erosion is to occur for asymmetric erosions, and the number of voxels to be eroded (as indicated by the symbol, "#"). For example, for Erosion Scheme "a", one dimension will be affected by the erosion. The erosion in the one dimension is defined in the column, Dimension 1 Erosion. Thus, Erosion Scheme "a" calls for a symmetric erosion of "#" number of voxels in the $x_1$ dimension. In general, a symmetric erosion comprises a depletion of "#" voxels evenly from each side or "face" (i.e., surface) in the $x_1$ dimension. So if "#" is 2 voxels and $x_1$ is X, for example, the Erosion Scheme "a" calls for the depletion of 1 voxel from each face (right and left) of a 2D data slice in the X dimension of the voxel-space object model 116.

In another example from the Erosion Table, for Erosion Scheme "c", two dimensions will be affected by the erosion. The erosions in the two dimensions are defined in the columns, Dimension 1 Erosion, and Dimension 2 Erosion. Thus, the Erosion Scheme "c" calls for a symmetric erosion of "#" number of voxels in the $x_1$ dimension, and a symmetric erosion of "#" number of voxels in the $x_2$ dimension. Therefore, if "#" is 2 voxels and $x_1$ is X in the Dimension 1 Erosion, and "#" is 4 voxels and $x_2$ is Y in the Dimension 2 Erosion, for example, then the Erosion Scheme "c" calls for the depletion of 1 voxel from each face (right and left) of a 2D data slice in the X dimension, and the depletion of 2 voxels from each face (upper and lower) of the 2D data slice in the Y dimension. Again, as noted above, $x_1$ can be any of x, y, or z dimensional directions, so $x_2$ can be either of the dimensional directions that remain.

In another example from the Erosion Table, for Erosion Scheme "d", two dimensions will be affected by the erosion. Again, the erosions in the two dimensions are defined in the columns, Dimension 1 Erosion, and Dimension 2 Erosion. Thus, Erosion Scheme "d" calls for an asymmetric erosion of "#" number of voxels in the $x_1$ dimension, and a symmetric erosion of "#" number of voxels in the $x_2$ dimension. Therefore, if "#" is 3 and $x_1$ is X in the Dimension 1 Erosion, and "#" is 2 and $x_2$ is Y in the Dimension 2 Erosion, for example, then Erosion Scheme "d" calls for the depletion in the X dimension of 1 voxel from one face and 2 voxels from the other face, and the depletion of 1 voxel from each face in the Y dimension. For the asymmetric erosion, the $x_1$ dimension can include a prefix of "+" or "−" to indicate on which face or side of the $x_1$ dimension the greater number of voxels will be removed/eroded. For example, "+$x_1$" can indicate that the "+" face (i.e., the right side) of the X

Erosion Table

| Erosion Scheme | No. of Dimensions Affected | Dimension 1 Erosion | Dimension 2 Erosion | Dimension 3 Erosion |
|---|---|---|---|---|
| a | 1 | $x_1$-symmetric-(#) | n/a | n/a |
| b | 1 | (+/−)$x_1$-asymmetric-(#) | n/a | n/a |
| c | 2 | $x_1$-symmetric-(#) | $x_2$-symmetric-(#) | n/a |
| d | 2 | (+/−)$x_1$-asymmetric-(#) | $x_2$-symmetric-(#) | n/a |
| e | 2 | (+/−)$x_1$-asymmetric-(#) | (+/−)$x_2$-asymmetric-(#) | n/a |
| f | 3 | $x_1$-symmetric-(#) | $x_2$-symmetric-(#) | $x_3$-symmetric-(#) |
| g | 3 | (+/−)$x_1$-asymmetric-(#) | $x_2$-symmetric-(#) | $x_3$-symmetric-(#) |
| h | 3 | (+/−)$x_1$-asymmetric-(#) | (+/−)$x_2$-asymmetric-(#) | $x_3$-symmetric-(#) |
| i | 3 | (+/−)$x_1$-asymmetric-(#) | (+/−)$x_2$-asymmetric-(#) | (+/−)$x_3$-asymmetric-(#) |

For each voxel data erosion scheme, the example Erosion Table indicates the number of dimensions to be affected by the voxel erosion (1, 2, or 3), the particular dimension or dimensions to be eroded ($x_1$, $x_2$, $x_3$), whether the erosion is symmetric or asymmetric, in which direction (+/−) the dimension is to have 2 voxels eroded, and the "−" face (i.e., the left side) of the X dimension is to have 1 voxel eroded.

Referring again to FIG. 1, when a voxel data erosion scheme has been determined from the voxel erosion source 122 (e.g., a voxel Erosion Table), as generally discussed above, the processor 112 can execute instructions in a scaling module 124 to generate a scaled or eroded voxel-space object model 126. The scaling module 124 controls the process of eroding the appropriate voxels within the voxel-space object model 116 according to the determined voxel data erosion scheme 122. Examples of such a process are discussed in more detail herein below with regard to FIG. 3 (FIGS. 3A, 3B, 3C, 3D, 3E, 3F) and FIG. 4 (FIGS. 4A, 4B, 4C, 4D). After a voxel-space object model 116 is scaled or eroded by the appropriate voxel data erosion scheme 122, the eroded voxel-space object model 126 can be processed into scaled 2D slice data 130 for printing. For example, the processor 112 can execute instructions from 2D slice generator module 128 to generate the scaled 2D slice data 130. The processor 112 can then further execute instructions from the render module 132 to generate 3D print system commands that can control the operation of components of the 3D printing system 100 in order to print layers of a 3D object corresponding with the scaled 2D slice data 130.

FIG. 3 (i.e., FIGS. 3A, 3B, 3C, 3D, 3E, 3F) shows an example process of eroding voxels of a voxel-space object model. Each of the FIGS. 3A, 3B, 3C, 3D, 3E, and 3F, shows an example of a top down view of a 2D digital layer of a 3D object to be printed. The voxels in each of FIGS. 3A, 3B, 3C, 3D, 3E, and 3F are intended to represent rectangular shaped volumes that correspond with the print resolution of an example 3D printing system 100. For example, the voxels can represent a volume having the dimensions of 42 microns in the X dimension, by 42 microns in the Y dimension, by 80 microns in the Z dimension. The Z dimension of the voxels in FIG. 3 is not shown, as the views are of 2D layers showing the X and Y dimensions.

Figure 3A:
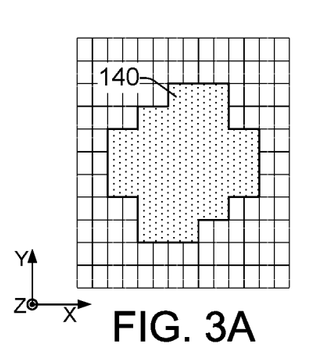
FIGS. 3A, 3B, 3C, 3D, 3E, 3F, each shows an example of a top down view of a 2D digital layer of a 3D object to be printed, to illustrate an example process of eroding voxels of a voxel-space object model.
Figure 3B:
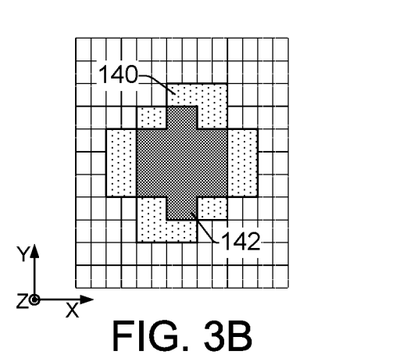

FIG. 3A shows, more specifically, an example of an original 2D voxel layer 140 prior to being scaled by scaling module 124 in a voxel data erosion process. FIG. 3B shows a scaled 2D voxel layer 142 resulting from the erosion of voxels from the original layer 140 (also shown for comparison) according to a voxel erosion scheme, such as the Erosion Scheme "c" shown above in the example Erosion Table. In the FIG. 3B example, an Erosion Scheme "c" comprises the symmetric erosion of voxels in 2 dimensions (i.e., Dimension 1 Erosion, Dimension 2 Erosion) indicated by $x_1$-symmetric-(#) and $x_2$-symmetric-(#). In this example, the $x_1$ dimension is the X dimension and the $x_2$ dimension is the Y dimension. In this example, the "#" comprises the number 2, indicating that 2 voxels are being removed in each dimension. Because the erosion is symmetric, 1 voxel is removed from either face of the 2D layer in both the X and Y dimensions, as shown in FIG. 3B.

Figure 3C:
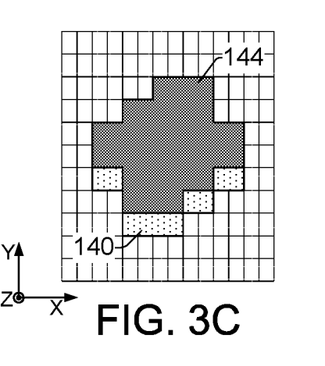

In another example, FIG. 3C shows a scaled 2D voxel layer 144 resulting from the erosion of voxels from the original layer 140 (also shown for comparison) according to a voxel erosion scheme, such as the Erosion Scheme "b" shown above in the example Erosion Table. In the FIG. 3C example, an Erosion Scheme "b" comprises the asymmetric erosion of voxels in 1 dimension indicated by $(-)x_1$-asymmetric-(#). In this example, the $x_1$ dimension is the Y dimension and the "#" comprises the number 1, indicating that 1 voxel is being removed in the Y dimension, as shown in FIG. 3C. The (−) sign preceding $x_1$ can indicate the 1 voxel is to be removed from the lower face of the Y dimension, rather than upper face of the Y dimension.

Figure 3D:
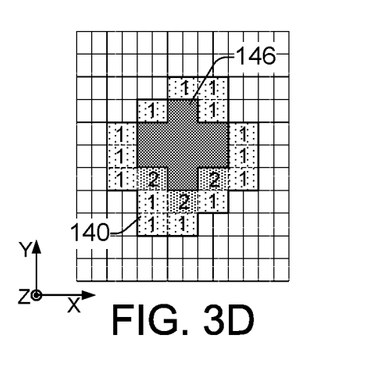

In another example, FIG. 3D shows a scaled 2D voxel layer 146 resulting from the erosion of voxels from the original layer 140 (also shown for comparison) according to two voxel erosion schemes from the example Erosion Table, to be performed in two erosion operations, one after the other. Thus, in some examples, target subvolumes and other factors can be associated with more than one voxel erosion scheme to achieve a particular erosion result. The two voxel erosion schemes used in the FIG. 3D example include Erosion Scheme "c" which is a symmetric erosion of voxels in 2 dimensions, and Erosion Scheme "b" which is an asymmetric erosion of voxels in 1 dimension. In this example, Erosion Scheme "c" is performed first to symmetrically erode 1 voxel on both faces or sides in the X dimension, and 1 voxel on both faces or sides in the Y dimension. As shown in FIG. 3D, the voxels eroded in the first erosion using Erosion Scheme "c" are labeled with a "1". The Erosion Scheme "b" is then performed to asymmetrically erode 1 voxel from the lower face in the Y dimension. As shown in FIG. 3D, the voxels eroded in the second erosion using Erosion Scheme "b" are labeled with a "2".

Figure 3E:
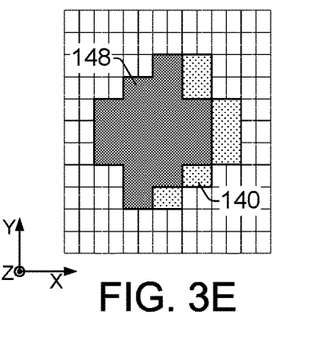
Figure 3F:
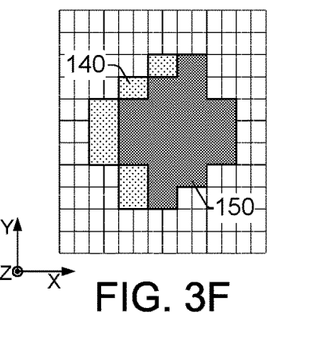

In other examples, FIGS. 3E and 3F show, respectively, scaled 2D voxel layers 148 and 150 resulting from the erosion of voxels from the original layer 140 (also shown for comparison) according to voxel erosion schemes shown in the example Erosion Table above. The Erosion Scheme "b" is used in both cases where there is an asymmetric erosion of 1 voxel in a single dimension, the X dimension. In FIG. 3E, the erosion can be indicated, for example, by (+)X-asymmetric-(1) to erode 1 voxel from the right side face in the X dimension. In FIG. 3F, the erosion can be indicated, for example, by (−)X-asymmetric-(1) to erode 1 voxel from the left side face in the X direction.

FIG. 4 (i.e., FIGS. 4A, 4B, 4C, 4D) shows examples of the effects of different processes of eroding voxels of a voxel-space object model 116. Each of the FIGS. 4A, 4B, 4C, and 4D, shows an example of a top down view of a 2D layer of a 3D object 151 being printed. The object being printed 151 comprises a rectangular base 152 portion with two posts 154 protruding upward toward the viewer in the Z dimension. FIG. 4A shows the intended shape of the object 151. FIG. 4B shows the shape of the object 151 with unintended face growth 156 in the +X dimensional direction of a magnitude represented by 1 voxel. In FIG. 4B, no voxel erosion scaling has been applied to the voxel-space object model to compensate for the growth.

Figure 4A:
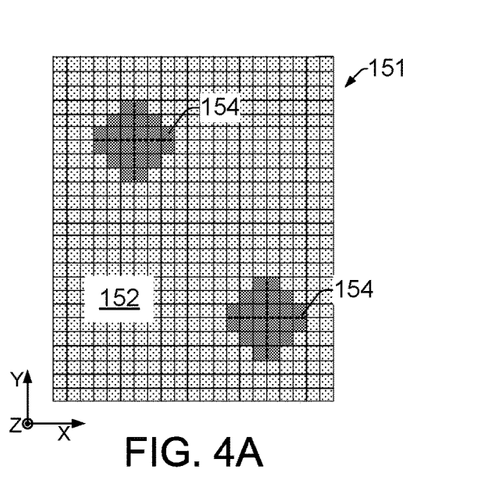
FIGS. 4A, 4B, 4C, 4D, each shows an example of a top down view of a 2D layer of a 3D object being printed, to illustrate the effects of different processes of eroding voxels of a voxel-space object model; and, FIGS. 5, 6A, 6B, and 7, are flow diagrams showing example methods of compensating for dimensional variation in 3D printing.
Figure 4B:
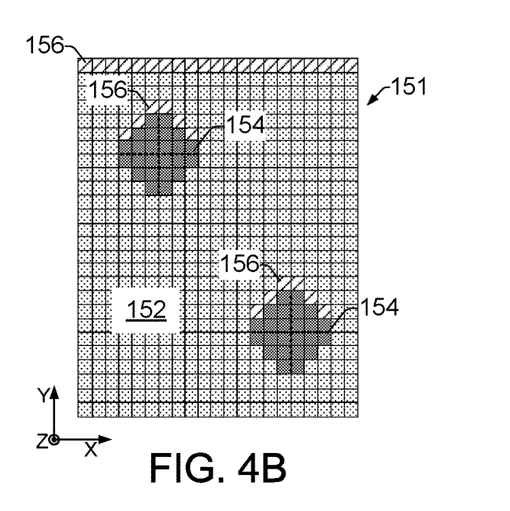
Figure 4C:
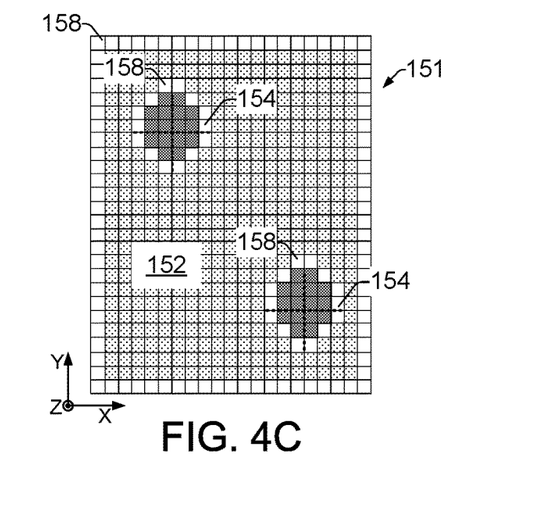

FIG. 4C shows the shape of the object 151 when an erosion scheme has been applied to the voxel-space model. The erosion scheme applied is Erosion Scheme "c" from the Erosion Table. As indicated by the resulting 2D object layer shown in FIG. 4C, the applied erosion to the voxel-space object model was symmetric, and it eroded 1 voxel 158 from each face in both the X and Y dimensions. Looking closely at the object 151 in FIG. 4C, it is apparent that the erosion resulted in a change in the relative positions of the two posts 154 and the rectangular base 152. That is, in the intended shape of the object as shown in FIG. 4A, the center point of the upper left post 154 should be 6 voxel dimensions from both the top and left sides of the rectangular base 152. However, after the erosion in FIG. 4C, the center point of the upper left post 154 is 6 voxel dimensions from the top side of the rectangular base 152, but only 5 voxel dimensions from the left side of the rectangular base 152. Accordingly, as discussed above, a uniform or symmetric 2D depletion of data voxels in the X and Y directional dimensions (i.e., Erosion Scheme "c") does not always effectively compensate for dimensional errors that are not symmetric.

Figure 4D:
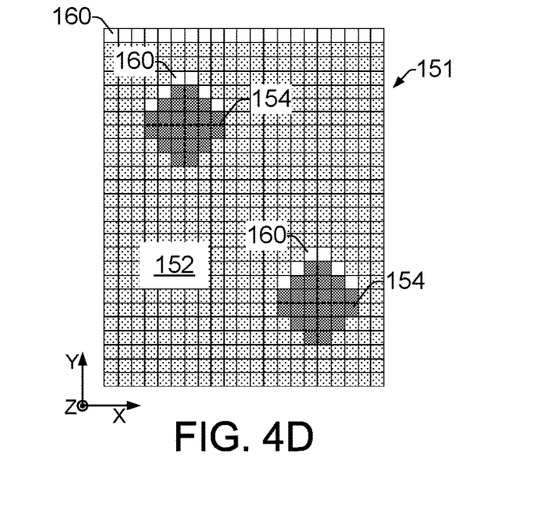

FIG. 4D shows the shape of the object 151 when a different erosion scheme has been applied to the voxel-space model. The erosion scheme applied is Erosion Scheme "b" from the Erosion Table. As indicated by the resulting 2D object layer shown in FIG. 4D, the applied erosion to the voxel-space object model was asymmetric, and it eroded 1 voxel 160 from one face in just the +Y dimension. This erosion corresponds with the unintended object growth shown in FIG. 4B, and it effectively compensates for, or avoids, that unintended object growth. Looking closely at the object 151 in FIG. 4D, it is apparent that the erosion resulted in maintaining the relative positions of the two posts 154 and the rectangular base 152. For example, in both the intended shape of the object as shown in FIG. 4A, and the resultant shape of the object as shown in FIG. 4D, the center point of the upper left post 154 is 6 voxel dimensions from both the top and left sides of the rectangular base 152.

Figure 5:
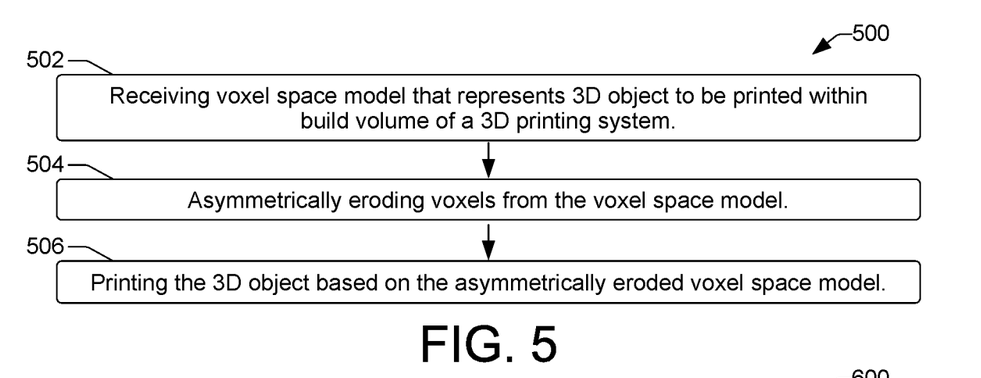
Figure 6A:
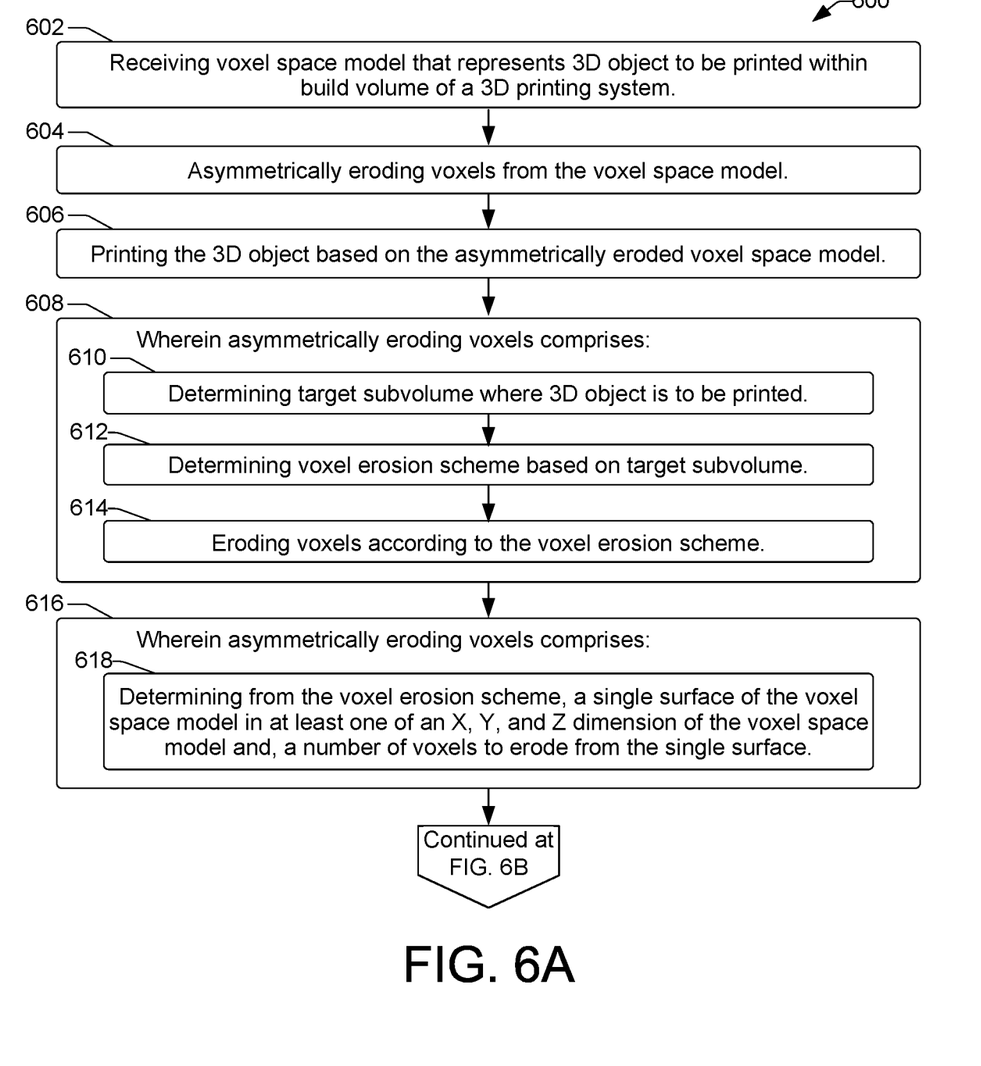
Figure 6B:
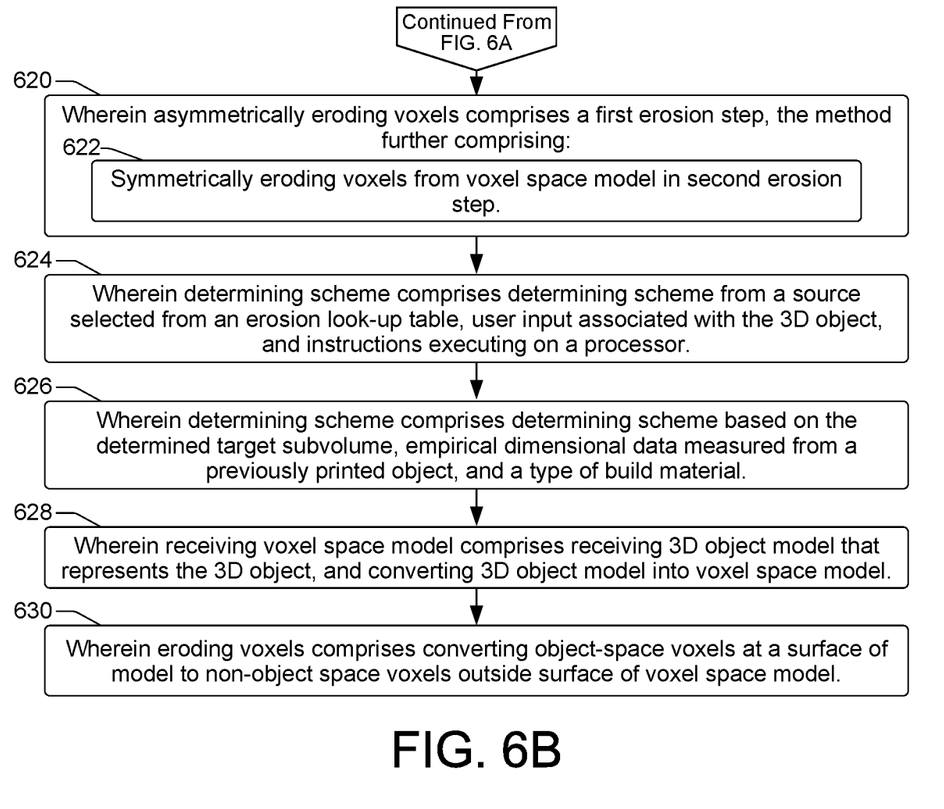

FIGS. 5, 6 (i.e., 6A, 6B), and 7, are flow diagrams showing example methods 500, 600 and 700, of compensating for dimensional variation in 3D printing. Method 600 comprises extensions of method 500 and incorporates additional details of method 500. Methods 500, 600 and 700 are associated with examples discussed above with regard to FIGS. 1-4, and details of the operations shown in methods 500, 600 and 700 can be found in the related discussion of such examples. The operations of methods 500, 600 and 700 may be embodied as programming instructions stored on a non-transitory, machine-readable (e.g., computer/processor-readable) medium, such as memory/storage 114 shown in FIG. 1. In some examples, implementing the operations of methods 500, 600 and 700 can be achieved by a controller with a processor, such as a controller 110 with a processor 112 of FIG. 1, reading and executing the programming instructions stored in a memory 114. In some examples, implementing the operations of methods 500, 600 and 700 can be achieved using an ASIC and/or other hardware components alone or in combination with programming instructions executable by a processor 112.

Figure 7:
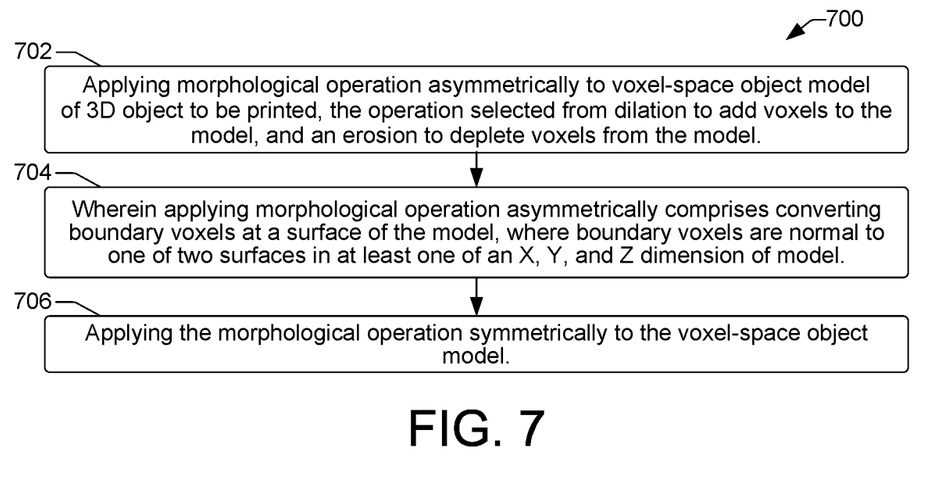

The methods 500, 600 and 700 may include more than one implementation, and different implementations of methods 500, 600 and 700 may not employ every operation presented in the respective flow diagrams of FIGS. 5, 6, and 7. Therefore, while the operations of methods 500, 600 and 700 are presented in a particular order within their respective flow diagrams, the order of their presentations is not intended to be a limitation as to the order in which the operations may actually be implemented, or as to whether all of the operations may be implemented. For example, one implementation of method 600 might be achieved through the performance of a number of initial operations, without performing other subsequent operations, while another implementation of method 600 might be achieved through the performance of all of the operations.

Referring now to the flow diagram of FIG. 5, an example method 500 of compensating for dimensional variation in 3D printing begins at block 502 with receiving a voxel space model that represents a 3D object to be printed within a build volume of a 3D printing system. The method continues with asymmetrically eroding voxels from the voxel space model (block 504), and printing the 3D object based on the asymmetrically eroded voxel space model (block 506).

Referring now to the flow diagram of FIG. 6 (i.e., FIGS. 6A, 6B), another example method 600 of compensating for dimensional variation in 3D printing is shown. Method 600 comprises extensions of method 500 and incorporates additional details of method 500. Accordingly, method 600 begins at block 602 with receiving a voxel space model that represents a 3D object to be printed within a build volume of a 3D printing system. The method continues with asymmetrically eroding voxels from the voxel space model (block 604), and printing the 3D object based on the asymmetrically eroded voxel space model (block 606). In some examples, asymmetrically eroding voxels from the voxel space model (block 608) can include determining a target subvolume from within the build volume in which the 3D object is to be printed (block 610), determining a voxel erosion scheme based on the target subvolume (block 612), asymmetrically eroding voxels according to the voxel erosion scheme (block 614). In some examples, asymmetrically eroding voxels according to the voxel erosion scheme (block 616) can include determining from the voxel erosion scheme, a single surface of the voxel space model in at least one of an X dimension, a Y dimension, and a Z dimension of the voxel space model, and a number of voxels to erode from the single surface (block 618).

The method 600 from FIG. 6A continues at FIG. 6B. In some examples, asymmetrically eroding voxels comprises a first erosion (block 620), and the method further includes symmetrically eroding voxels from the voxel space model in a second erosion (block 622). In some examples of method 600, determining a voxel erosion scheme includes determining the voxel erosion scheme from a voxel erosion source selected from an erosion look-up table that associates the target subvolume with the voxel erosion scheme, user input associated with the 3D object to be printed, and instructions executing on a processor (block 624). In some examples, determining a voxel erosion scheme includes determining the voxel erosion scheme based on the determined target subvolume, empirical dimensional data measured from a previously printed object, and a type of build material (block 626). In some examples, receiving a voxel space model includes receiving a 3D object model that represents the 3D object to be printed, and converting the 3D object model into the voxel space model (block 628). In some examples, asymmetrically eroding voxels can include converting object space voxels at a surface of the voxel space model into non-object space voxels outside the surface of the voxel space model (block 630).

Referring now to the flow diagram of FIG. 7, another example method 700 of compensating for dimensional variation in 3D printing begins at block 702 with applying a morphological operation asymmetrically to a voxel-space object model that represents a 3D object to be printed, where the operation is selected from a dilation operation to add voxels to the model, and an erosion operation to deplete voxels from the model. In some examples, applying a morphological operation asymmetrically includes converting boundary voxels at a boundary surface of the voxel-space object model, where the boundary voxels are normal to one of two surfaces in at least one of an X dimension, a Y dimension, and a Z dimension of the voxel space model (block 704). In some examples, method 700 can further include applying the morphological operation symmetrically to the voxel-space object model (block 706).

What is claimed is:

1. A method of compensating for dimensional variation in 3D printing comprising:
   receiving, by a processor, a voxel space model that represents a 3D object to be printed within a build volume of a 3D printing system;
   determining, by the processor, a target subvolume from within the build volume in which the 3D object is to be printed;
   determining, by the processor, a voxel erosion scheme based on the determined target subvolume, empirical dimensional data measured from a previously printed object, and a type of build material;

asymmetrically eroding, by the processor, voxels from the voxel space model according to the voxel erosion scheme; and printing the 3D object based on the eroded voxel space model.

2. A method as in claim 1, wherein asymmetrically eroding voxels according to the voxel erosion scheme comprises:

determining from the voxel erosion scheme:
a single surface of the voxel space model in at least one of an X dimension, a Y dimension, and a Z dimension of the voxel space model; and
a number of voxels to erode from the single surface.

3. A method as in claim 1, wherein asymmetrically eroding voxels comprises a first erosion, the method further comprising:

symmetrically eroding, by the processor, voxels from the voxel space model in a second erosion.

4. A method as in claim 1, wherein determining a voxel erosion scheme comprises determining the voxel erosion scheme from a voxel erosion source selected from an erosion look-up table that associates the target subvolume with the voxel erosion scheme, and user input associated with the 3D object to be printed.

5. A method as in claim 1, wherein receiving a voxel space model comprises:

receiving, by the processor, a 3D object model that represents the 3D object to be printed; and
converting, by the processor, the 3D object model into the voxel space model.

6. A method as in claim 1, wherein asymmetrically eroding voxels comprises converting object space voxels at a surface of the voxel space model into non-object space voxels outside the surface of the voxel space model.

7. A dimensional variation compensating 3D printing system comprising:

a memory to receive a voxel space object model that represents a 3D object to be printed within a build volume of the 3D printing system;
a processor programmed to erode voxels at one of two boundary surfaces in at least one of an X, Y, and Z dimension of the voxel space model, both asymmetrically in a first erosion and symmetrically in a second erosion; and
print system components controllable by the processor to print the 3D object according to the eroded voxel space model.

8. A 3D printing system as in claim 7, wherein:

the voxel space object model comprises positioning information indicating a subvolume within the build volume for printing a portion of the 3D object; and
the processor is programmed to control the erosion of voxels in the voxel space object model associated with the portion of the 3D object according to a voxel erosion scheme associated with the indicated subvolume.

9. A 3D printing system as in claim 8, further comprising:

an erosion look up table stored in the memory to associate each of a plurality of subvolumes within the build volume with a particular voxel erosion scheme,
wherein the processor is programmed to access a particular voxel erosion scheme from the table based on an indicated subvolume, and to apply the voxel erosion scheme during a voxel erosion operation to control a symmetry, magnitude, and location of voxel erosion to the voxel space model.

10. A 3D printing system as in claim 8, wherein the build volume comprises numerous subvolumes distinguished based on varying thermal characteristics throughout the build volume.

11. A method of compensating for dimensional variation in 3D printing comprising:

applying asymmetrically, in a first erosion, a morphological operation to a voxel-space object model that represents a 3D object to be printed, the operation selected from a dilation operation to add voxels to the model, and an erosion operation to deplete voxels from the model;
applying symmetrically, in a second erosion, the morphological operation to the voxel-space object model; and
printing the 3D object based on the eroded voxel space model.

12. A method as in claim 11, wherein applying a morphological operation asymmetrically comprises converting boundary voxels at a boundary surface of the voxel-space object model, the boundary voxels being normal to one of two surfaces in at least one of an X dimension, a Y dimension, and a Z dimension of the voxel space model.

\* \* \* \* \*